No. 675,182. Patented May 28, 1901.
J. A. ZERBES.
BAND CUTTING AND STALK FEEDING ATTACHMENT FOR CORN HUSKING AND STALK SHREDDING MACHINES.
(Application filed Apr. 9, 1900.)
(No Model.) 3 Sheets—Sheet 1.
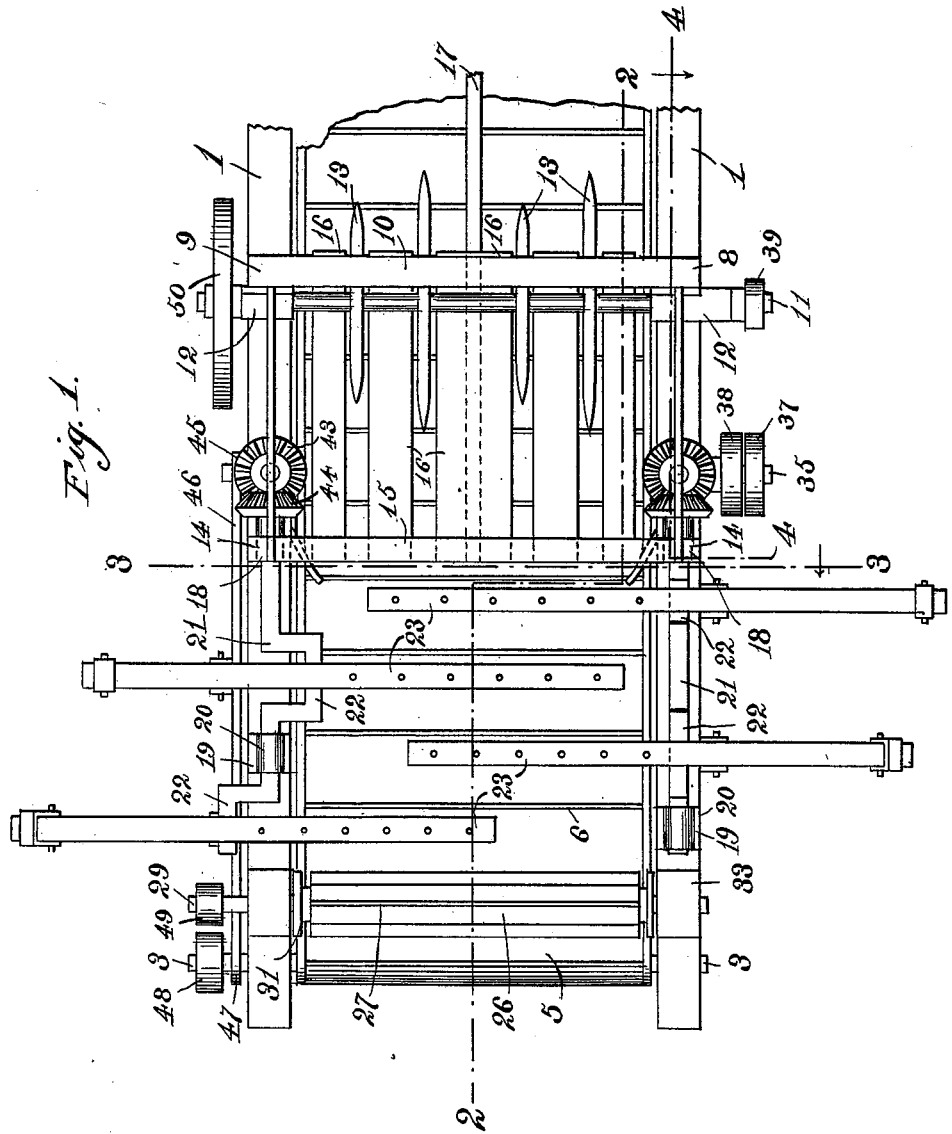
Witnesses:
E. F. Wilson
W. B. Snowhook
Inventor:
Joseph A. Zerbes
By Rudolph Wm. Lotz
Attorney.

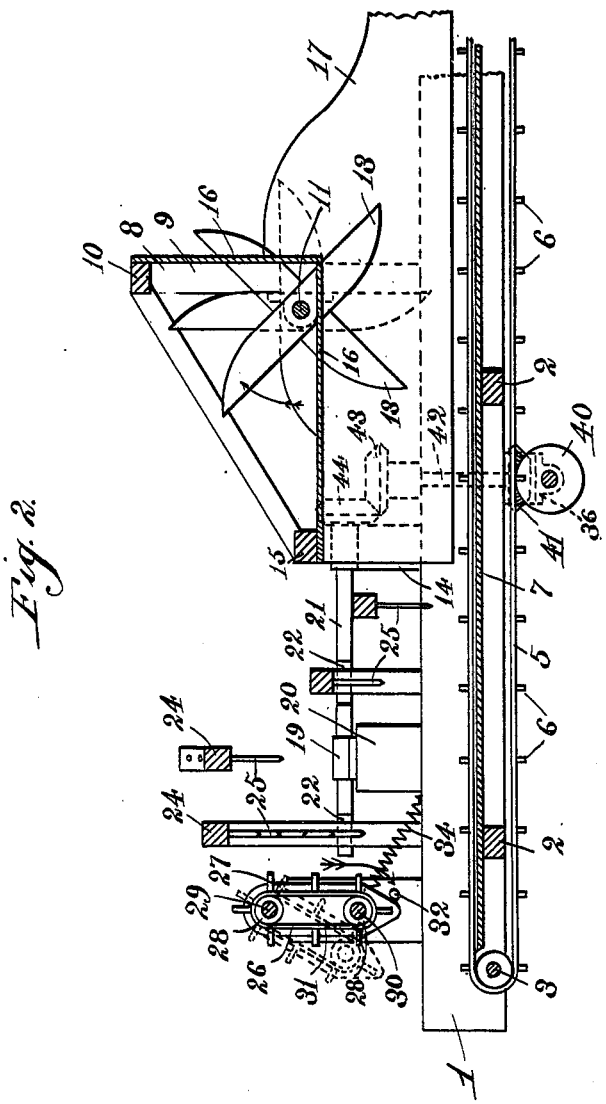

No. 675,182. Patented May 28, 1901.
J. A. ZERBES.
BAND CUTTING AND STALK FEEDING ATTACHMENT FOR CORN HUSKING AND STALK SHREDDING MACHINES.
(Application filed Apr. 9, 1900.)
(No Model.) 3 Sheets—Sheet 3.
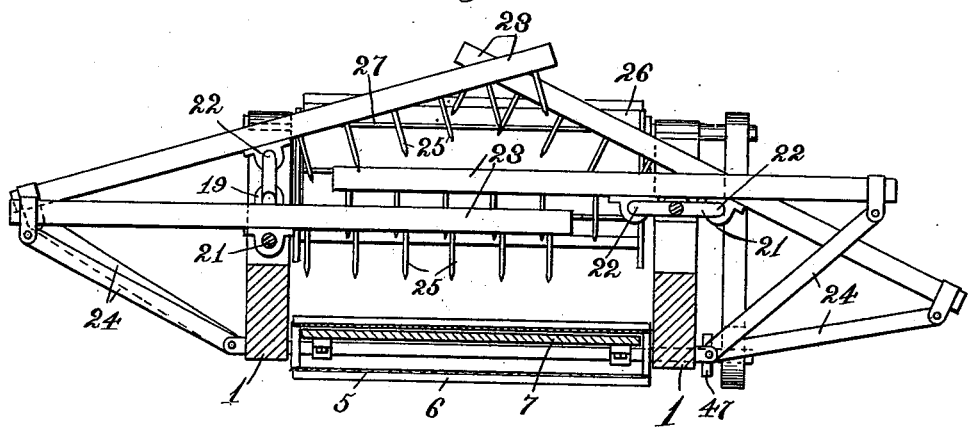
Witnesses:
E. F. Wilson.
W. B. Snowhook.
Inventor:
Joseph A. Zerbes
By Rudolph &c.
Attorney.

UNITED STATES PATENT OFFICE.

JOSEPH A. ZERBES, OF PLAINFIELD, ILLINOIS.

BAND-CUTTING AND STALK-FEEDING ATTACHMENT FOR CORN-HUSKING AND STALK-SHREDDING MACHINES.

SPECIFICATION forming part of Letters Patent No. 675,182, dated May 28, 1901.

Application filed April 9, 1900. Serial No. 12,135. (No model.)

*To all whom it may concern:*

Be it known that I, JOSEPH A. ZERBES, a citizen of the United States, residing at Plainfield, in the county of Will and State of Illinois, have invented certain new and useful Improvements in Band-Cutting and Stalk-Feeding Attachments for Corn-Husking and Stalk-Shredding Machines; and I do hereby declare the following to be a full, clear, and exact description of the invention, such as will enable others skilled in the art to which it appertains to make and use the same.

My invention relates to a novel construction in a band-cutting and stalk-feeding attachment for corn-husking and stalk-shredding machines, the object being to provide a device which will feed the stalks in even layers to snapping-rolls of the corn-husker; and it consists in the features of construction and combinations of parts hereinafter fully described and claimed.

In the accompanying drawings, illustrating my invention, Figure 1 is a top plan view of a device constructed in accordance with my invention. Fig. 2 is a vertical longitudinal section of same on the line 2 2 of Fig. 1. Fig. 3 is a transverse section of same on the line 3 3 of Fig. 1. Fig. 4 is a detail section on the line 4 4 of Fig. 1.

My device consists of a frame comprising two side pieces 1, connected together by means of a plurality of cross-pieces 2, said frame being adapted to be suitably supported at one end of a corn-husking and stalk-shredding machine in any suitable manner. Journaled in bearings in said side pieces 1 of said frame are shafts 3, (only one of which is shown,) carrying pulleys 4, over which a belt 5 is trained, which carries lateral slats 6 and which acts as a carrier for the cornstalks. A platform 7 is carried by said cross-pieces 2 within said belt, which acts as a support for the latter. A frame 8 is carried by said side pieces 1 and comprises two standards 9, connected together at their upper ends by means of a cross-piece 10. A shaft 11 is journaled in bearings 12, carried by said standards 9, and carries band-cutters 13 at intervals, which describe circles approaching said belt 5 sufficiently to cause the bundles of stalks carried by the latter to intersect the same, thus obviously causing the bands securing said stalks to be severed by said cutters. Standards 14 are carried by said side pieces 1 rearwardly of said frame 8, the same being connected by a cross-piece 15 at their upper ends, said cross-piece 15 being about on a level with said shaft 11. L-shaped plates 16, secured at opposite ends to said cross-pieces 10 and 15, respectively, pass underneath and in front of said shaft 11 between said cutters 13 and serve to prevent cornstalks from rising or becoming entangled with said shaft 11. A longitudinal dividing-board 17 is suitably supported by said cross-piece 10 and one of said plates 16 and divides the front portion of the frame of the machine to form two runways of insufficient width to permit any cornstalks from assuming a lateral position on said belt 5. Journaled in bearings 18 on said standards 14 and in bearings 19 on standards 20 are two longitudinal crank-shafts 21, each provided with two diametrically opposite cranks 22, on which rakes 23 are pivotally mounted between their ends, the free ends of said rakes projecting above said belt 5 and being adapted to agitate the stalks carried thereby to spread the same evenly over said belt. The outer ends of said rakes are pivotally secured to the outer ends of links 24, pivoted at their inner ends to the sides of the frame of the machine. Said shafts 21 are relatively so set that the cranks of one always extend at an angle of about ninety degrees to the cranks of the other, thereby causing said rakes to be brought into engagement with the stalks consecutively. The pins or teeth 25 of said rakes and the lowest limit of movement of the latter are so adjusted that said teeth just brush over the stalks, but do not violently engage and agitate the latter, their object being mainly to engage any stalk or stalks which may be superimposed upon other stalks and cause same to find a place between the others, so as to form a uniform layer on the belt, this being essential to the proper working of the stalk-cutting machine. To further insure this, however, I have provided a belt 26, carrying rattles or slats 27, which is trained over rollers 28, carried by shafts 29 and 30, the latter being journaled in the free end of a swinging frame 31, pivoted on said shaft 29. Said frame is so arranged that said rattles or slats 27 move into the path of the stalks when piled upon one another and depress the upper stalks. Said frame 31 is free to swing toward the front end of the machine, as indicated in dotted lines in Fig. 2, but is limited in its movement in the other direction by means of pins 32 in the standards 33, in the upper ends of which said shaft 29 is journaled. Said frame is normally held at the inner limit of its movement by means of springs 34 in an obvious movement.

Said machine is driven from any suitable source of power, the drive-gear comprising a drive-shaft 35, journaled in bearings 36, carried by said side pieces 1, said shaft extending laterally below the frame and at one end carrying pulleys 37 and 38, one of said pulleys being adapted to be geared to a source of power and the other with a pulley 39 on the shaft 11. Between its ends said shaft 35 carries bevel-gears 40, meshing with bevel-gears 41 on the lower ends of vertical shafts 42, journaled in bearings in said side pieces 1. Said shafts 42 are geared to said crank-shafts 21 by means of intermeshing bevel-gears 43 and 44. At its other end said shaft 35 carries a sprocket-wheel 45, which is geared, by means of a sprocket-chain 46, with a sprocket-wheel 47, carried by the foremost shaft 3. The latter carries a pulley 48, which is geared to a pulley 49, carried by the shaft 29. Said shaft 11 carries a balance-wheel 50 at one end to insure uniform running of the machine.

My device dispenses with the labor of two men generally required to cut bands and spread the cornstalks evenly over the feed-belt and is simple, durable, and efficient.

I claim as my invention—

1. In a machine of the kind specified, the combination with a feed-belt adapted to carry bundles of cornstalks, of a lateral shaft above said belt carrying knives adapted to move in the path of said bundles and cut the bands thereof, and devices moving laterally over said belt and adapted to engage said cornstalks and spread same evenly over said belt, said devices comprising two parallel crank-shafts journaled in bearings one on each side of said belt, rakes pivoted between their ends on the cranks of said shafts and moving over said belt at their free ends, the outer ends of said rakes being pivotally secured to the outer ends of links pivotally secured at their inner ends to the sides of the frame.

2. In a machine of the kind specified, the combination with a feed-belt adapted to carry bundles of cornstalks, of a lateral shaft above said belt carrying knives adapted to move in the path of said bundles and cut the bands thereof, and devices moving laterally over said belt and adapted to engage said cornstalks and spread same evenly over said belt, said devices comprising two parallel crank-shafts journaled in bearings one on each side of said belt, rakes pivoted between their ends on the cranks of said shafts and moving over said belt at their free ends, the rakes pivoted on one shaft operating to move the stalks to one side of said belt and the rakes pivoted on the other shaft being adapted to overlap said first-mentioned rakes, and to move the stalks to the opposite side of said belt, the outer ends of said rakes being pivotally secured to the outer ends of links pivotally secured at their inner ends to the sides of the frame.

In testimony whereof I affix my signature in presence of two witnesses.

JOSEPH A. ZERBES.

Witnesses:
RUDOLPH WM. LOTZ,
WM. B. SNOWHOOK.